United States Patent
Chandra (10) Patent No.: US 9,774,724 B2
(45) Date of Patent: *Sep. 26, 2017

(54) INTELLIGENT TELEPHONE CALL ROUTING

(71) Applicant: Fortinet, Inc., Sunnyvale, CA (US)

(72) Inventor: Sekhar Sumanth Gorajala Chandra, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/710,410

(22) Filed: May 12, 2015

(65) Prior Publication Data

US 2016/0269549 A1   Sep. 15, 2016

Related U.S. Application Data

(63) Continuation of application No. 14/644,013, filed on Mar. 10, 2015.

(51) Int. Cl.
*H04M 3/22* (2006.01)
*H04M 3/42* (2006.01)
*H04M 3/54* (2006.01)

(52) U.S. Cl.
CPC ..... *H04M 3/2218* (2013.01); *H04M 3/42195* (2013.01); *H04M 3/546* (2013.01); *H04M 2203/551* (2013.01)

(58) Field of Classification Search
USPC ............................................ 379/246, 201.12
See application file for complete search history.

(56) References Cited

U.S. PATENT DOCUMENTS

| | | | |
|---|---|---|---|
| 6,931,119 B2 | 8/2005 | Michelson | |
| 7,120,243 B2 * | 10/2006 | Milton | H04M 3/4234 379/201.12 |
| 7,627,101 B2 * | 12/2009 | Chang | H04M 3/42195 379/198 |

(Continued)

OTHER PUBLICATIONS

Non-Final Rejection for U.S. Appl. No. 14/644,013 mailed May 18, 2016.
U.S. Appl. No. 14/644,013, filed Mar. 10, 2015.

*Primary Examiner* — Amal Zenati
(74) *Attorney, Agent, or Firm* — Hamilton, DeSanctis & Cha LLP (57) ABSTRACT

Systems and methods for intelligently routing an incoming telephone call to an internal extension based on the calling history are provided. According to one embodiment, a session log, containing information regarding sessions between internal extension numbers and external telephone numbers, is maintained by a call monitor of a telephone system. The internal extension numbers are associated with telephone extensions within the telephone system and the external telephone numbers are associated with telephones outside of the telephone system. An incoming telephone call is received by the call monitor from a telephone outside the telephone system that is associated with an external telephone number. It is determined by the call monitor whether the incoming call represents a call-back to an internal extension number based on the session log. When the incoming call is determined to represent a call-back, then causing a switch to route the incoming call to the internal extension number.

20 Claims, 4 Drawing Sheets

(56) References Cited

U.S. PATENT DOCUMENTS

| | | | | |
|---|---|---|---|---|
| 8,958,538 B1* | 2/2015 | Blaesi | ................ | H04M 3/5232 379/210.01 |
| 2006/0262921 A1* | 11/2006 | Eppel | ................... | H04M 3/523 379/265.02 |

* cited by examiner

FIG. 4

INTELLIGENT TELEPHONE CALL ROUTING

CROSS-REFERENCE TO RELATED PATENTS

This application is a continuation of U.S. patent application Ser. No. 14/644,013, filed on Mar. 10, 2015, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to the field of telecommunications. In particular, various embodiments relate to intelligently routing incoming telephone calls to internal extensions by telephone systems.

Description of the Related Art

Figure 1:
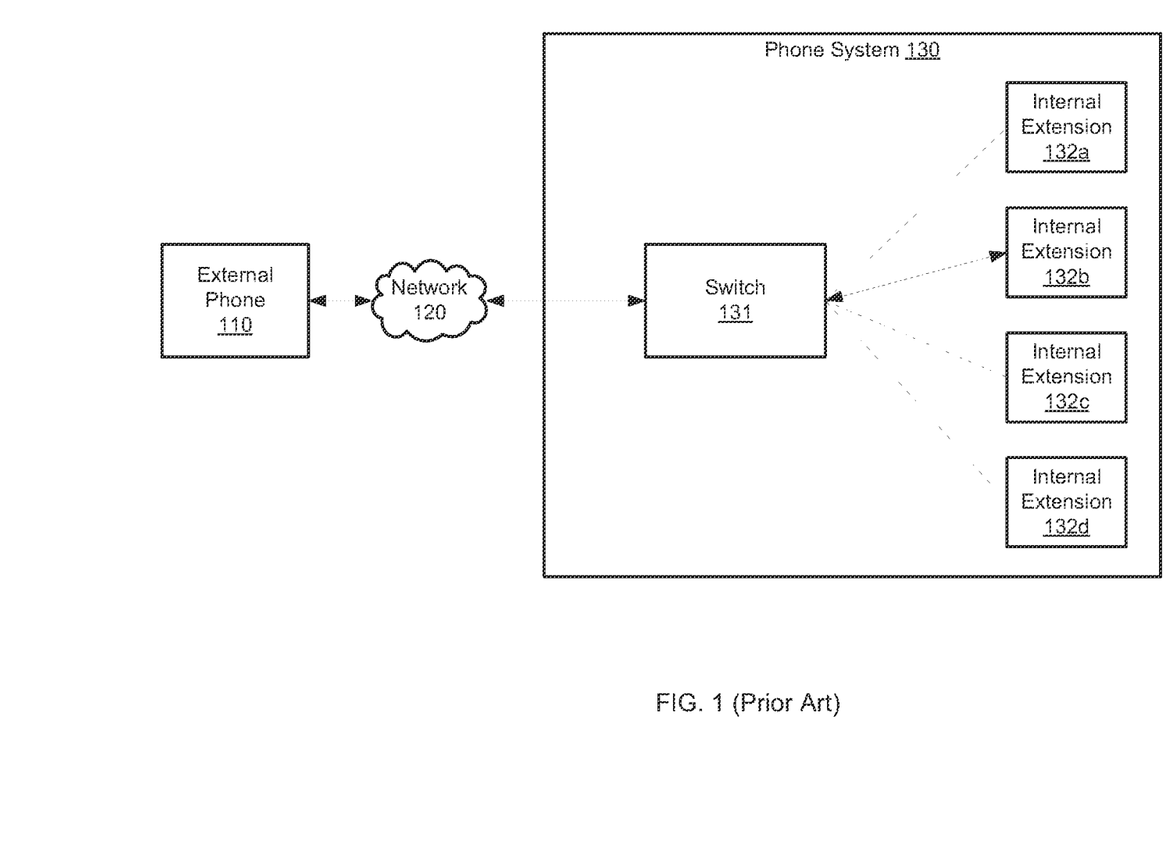
FIG. 1 conceptually illustrates a block diagram of a typical prior art telephone system with multiple internal extensions.

Today, telephone system deployments are very important to companies. A telephone system with thousands of extensions may be deployed in a company that has a large services or sales department. These extensions are not typically confined to a specific geographic location and can be spread across regions and boundaries. FIG. 1 conceptually illustrates a block diagram of a typical prior art telephone system 130 with multiple internal extensions. Telephone system 130 comprises a switch 131 and multiple internal extensions 132a-d. Telephone system 130 connects to a network 120, which is an Internet Protocol (IP)-based network or a public switched telephone network (PSTN). Switch 131 is assigned one or more PSTN telephone numbers so that it can be accessed through network 120. The PSTN telephone numbers may be ten digits based on the North American Numbering Plan. Each extension inside telephone system 130 is assigned with an internal extension number by telephone system 130. Internal extension numbers may be 3-5 digits long.

When an incoming telephone call is initiated from an external phone 110 to telephone system 130, external phone 110 dials the PSTN telephone number of telephone system 130. After external phone 110 is connected to switch 131 of telephone system 130, switch 131 may play an option message and ask external phone 110 to dial an internal extension number or transfer the call to an operator. If external phone 110 further dials the internal extension number, then the telephone call is routed to the internal extension with the internal extension number, such as internal extension 132b. When internal extension 132b receives the telephone call from external phone 110, a PSTN number of external phone 110 may be displayed at internal extension 132b. When an outgoing telephone call is initiated from an internal extension (internal extension 132b, for example) inside telephone system 130 to external phone 110, internal extension 132b dials the PSTN number of external phone 110. Switch 131 then tries to establish a connection between internal extension 132b and external phone 110 through network 120. When external phone 110 receives the telephone call from the internal extension 132b, the PSTN number of switch 131 may be displayed at external phone 110 and external phone 110 does not know the internal extension number of the internal extension 132b.

In some cases, a caller makes a telephone call from an internal extension of the telephone system to a callee who is outside the telephone system but the callee does not answer the telephone call. When the callee wants to later return the caller's call, the callee cannot reach the caller directly because the caller only has the PTSN number of the telephone system without the internal extension number of the caller. Even when the caller leaves a voice message with his internal extension number, it is not very convenient for the callee to return the call as the callee still needs to retrieve the internal extension number from voice mail and dial both the PTSN number of the telephone system and the internal extension number.

In some other cases, when a caller makes a telephone call from an external phone to the telephone system, the telephone call is answered by a random internal extension of the telephone system. For example, a switch or an operator of the telephone system may randomly pick up an available internal extension to answer the incoming telephone call. When the caller calls again, potentially a short time later, it may be that he/she would like the same internal extension to answer his/her call. However, the caller cannot dial the internal extension number because he/she does not know the internal extension number that previously answered. Even when the caller knows the internal extension number, it is still not very convenient for caller repeat the previous call as he/she needs to remember and dial the internal extension number every time he/she makes the same call.

Therefore, there is a need for a more intelligent call management system to select an internal external extension to answer incoming telephone calls.

SUMMARY

Systems and methods are described for intelligently routing an incoming telephone call to an internal extension based on the calling history. According to one embodiment, a session log is maintained by a call monitor of a telephone system. The session log contains information regarding sessions between internal extension numbers and external telephone numbers. The internal extension numbers are associated with telephone extensions within the telephone system and the external telephone numbers are associated with telephones outside of the telephone system. An incoming telephone call is received by the call monitor from a telephone outside the telephone system that is associated with an external telephone number. It is determined by the call monitor whether the incoming call represents a callback to an internal extension number based on the session log. When the incoming call is determined to represent a call-back, then causing a switch to route the incoming telephone call to the internal extension number.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for intelligently routing an incoming telephone call to an internal extension based on the calling history. A call monitor of a telephone system maintains a session log for recording sessions between internal extension numbers and external telephone numbers, wherein each of the internal extension numbers is associated with an internal extension inside the telephone system and each of external telephone numbers is associated with a telephone outside the telephone system. When an incoming telephone call from an external telephone number is received, the call monitor searches the session log to find a matched session, wherein the external telephone number of the matched session is the same as the external telephone number of the incoming telephone call. Next, the incoming telephone call is routed to an internal extension number of the matched session.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

Figure 2:
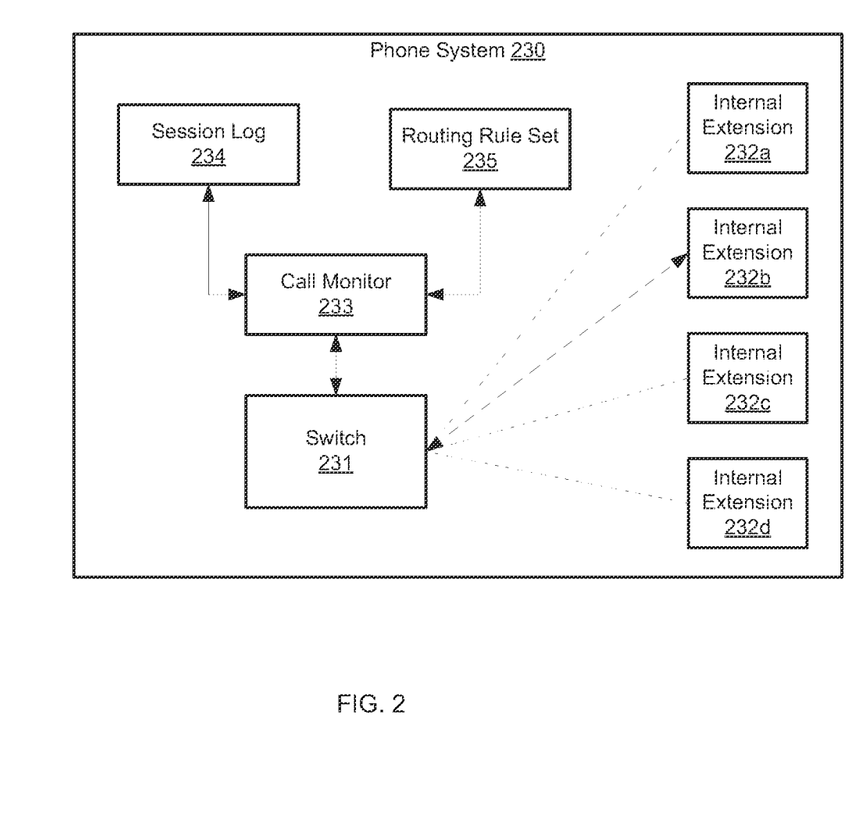
FIG. 2 illustrates exemplary functional units of a telephone system in accordance with an embodiment of the present invention.

FIG. 2 illustrates exemplary functional units of a telephone system 230 in accordance with an embodiment of the present invention. In FIG. 2, telephone system 230 may include a switch 231, multiple internal extension 232a-d, a call monitor 233, a session log 234 and a routing rule set 235. Telephone system 230 may be a circuit-switched telephone network or a voice over IP (VoIP) telephone system. Telephone system 230 may connect to a PSTN or an IP-based network (not shown). Switch 231 may be a telephone switch or a VoIP server that is capable of establishing a connection between an internal extension with an external telephone through a PSTN or an IP-based network. Switch 231 is assigned with a PSTN telephone number by a PSTN carrier. Each of internal extensions 232a-d is assigned with an internal extension number by telephone system 230. Call monitor 233 is connected to switch 231 and capable of monitoring incoming and outgoing telephone calls of telephone system 230. Information regarding sessions that have been initiated or established between internal extensions and external telephones are recorded within session log 234. Session log 234 may be a local, a remote or a cloud-based database that is connected to telephone system 230. Table 1 shows an example of session log 234.

TABLE 1

| Type | Calling Party | Called Party | Start Time | End Time | Duration |
|---|---|---|---|---|---|
| Outgoing | 81617 | 408-991-4409 | Jan. 1, 2015 1:05 p.m | Jan. 1, 2015 1:15 p.m | 10 min |
| Outgoing | 81517 | 415-999-4123 | Jan. 1, 2015 1:15 p.m | Jan. 1, 2015 1:25 p.m | 10 min |
| Outgoing | 81417 | 615-991-4610 | Jan. 1, 2015 1:35 p.m | Jan. 1, 2015 1:37 p.m | 2 min |
| Incoming | 415-999-4123 | 81517 | Jan. 1, 2015 1:15 p.m | Jan. 1, 2015 1:19 p.m | 4 min |
| Incoming | 615-991-4610 | 81417 | Jan. 1, 2015 1:35 p.m | Jan. 1, 2015 1:35 p.m | 0 min |
| Incoming | 615-991-4610 | 81417 | Jan. 1, 2015 1:35 p.m | Jan. 1, 2015 1:35 p.m | 0 min |
| Internal | 81517 | 81417 | Jan. 1, 2015 2:35 p.m | Jan. 1, 2015 2:36 p.m | 1 min |
| Internal | 81617 | 81417 | Jan. 1, 2015 3:35 p.m | Jan. 1, 2015 3:39 p.m | 4 min |

In Table 1, session log 234 includes information regarding a type, a calling party, a called party, a start time, an end time and a duration for each call observed by call monitor 233. The type of a call may be enumerated as an incoming telephone call, an outgoing call or an internal call.

For an incoming telephone call, the calling party may be represented by the external telephone number that initiated the telephone call from outside telephone system 230. The called party may be represented by an internal extension number that the incoming telephone call was routed to by switch 231.

For an outgoing telephone call, the calling party may be represented by an internal extension number that initiated the telephone call from within telephone system 230. The called party may be represented an external telephone number that was dialed by the internal extension.

The start time and end time fields record the times and/or dates that telephone calls are started/ended. The duration field records the duration of the session between the calling party and the called party.

In the present embodiment, when an incoming telephone call from an external telephone number is routed by the network to switch 231, the external telephone number of the incoming telephone call is sent to call monitor 233. Call monitor 233 may determine if the incoming call is a callback to an internal extension number based on the session log 234. A "call-back" generally refers to an incoming call from a external telephone number that was previously called by an internal extension number (potentially, within a predefined or configurable amount of time as discussed further below). For example, call monitor 233 may search for the external telephone number in session log 234. If the external telephone number is found in the called party field of session log 234, it means that an internal extension has called the external telephone number before. If the external telephone number is found in the calling party of session log 234, it means that the external telephone number has called telephone system 230 before. Call monitor 233 may extract one or more internal extension numbers that have established sessions with the external telephone number from session log 234. Call monitor 233 may further check routing rule set 235 to determine if an internal extension number should be used for routing the present incoming telephone call. For example, call monitor 233 may calculate a probability score that the incoming phone call is a call-back to the internal extension number based on information regarding sessions between the external telephone number and the internal extension number. When the probability score is higher than a predetermined and/or configurable threshold, then call monitor 233 may determine that the external telephone call is a call-back to the internal extension number and therefore that the present incoming call is to be routed to the internal extension number. Then, call monitor 233 may send the internal extension number to switch 231 and the incoming telephone call is routed to the internal extension number by switch 231.

Figure 3:
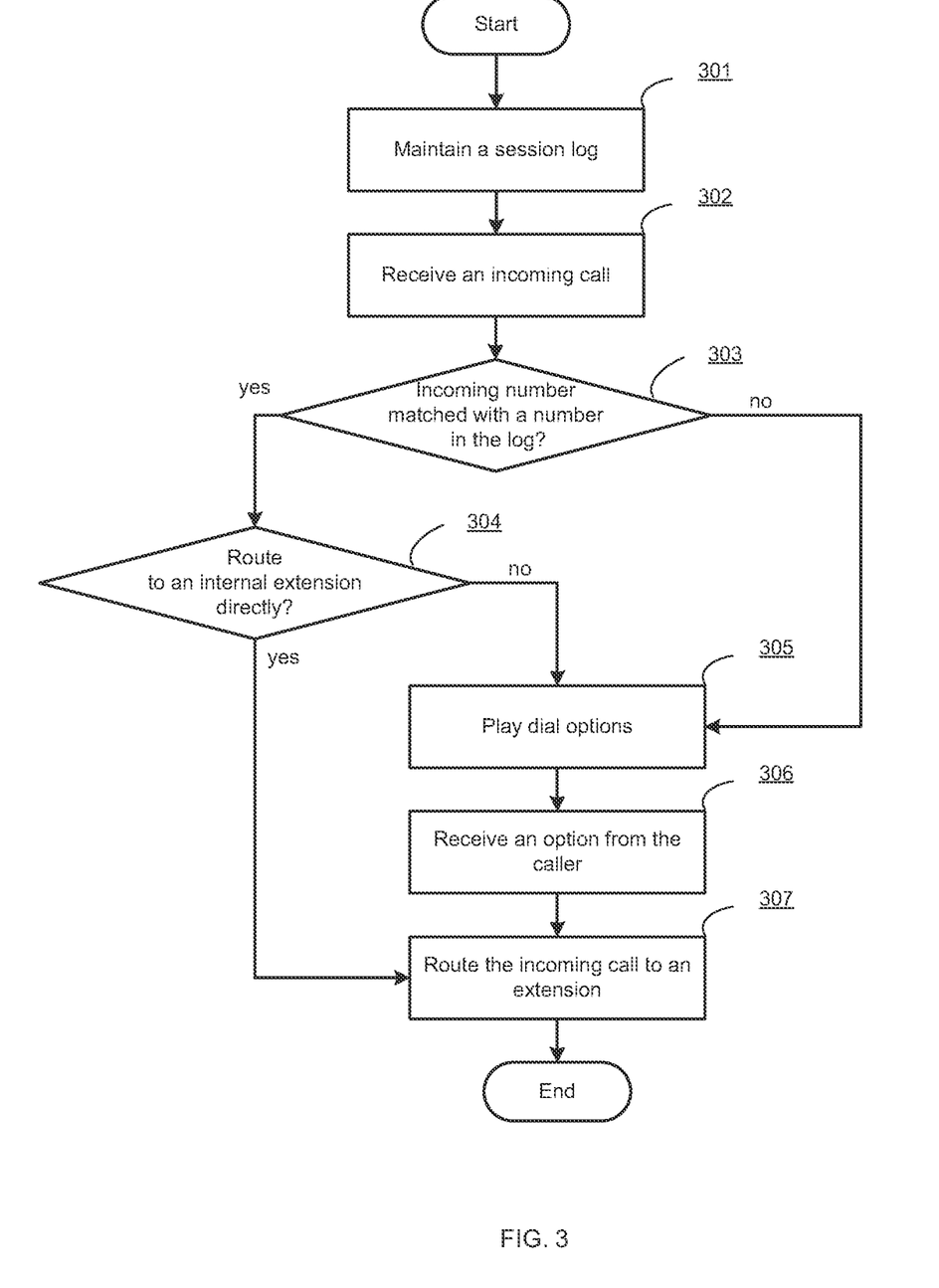
FIG. 3 is a flow diagram illustrating a method for routing an incoming telephone call from an external telephone number to an internal extension of a telephone system based on calling history recorded by the telephone system in accordance with an embodiment of the present invention.

FIG. 3 is a flow diagram illustrating a method for routing an incoming telephone call to an internal extension of a telephone system in accordance with a calling history in accordance with an embodiment of the present invention.

At block 301, a session log is maintained by a telephone system. The session log keeps track of inbound, outbound and/or internal telephone calls with respect to the telephone system. The session log may track telephone calls that were established successfully and/or unsuccessfully between (i) external telephone numbers and internal extension numbers and/or (ii) internal extension numbers. Session information, such as the type of call, the calling party, the called party, the start time, the end time and the duration of telephone calls, may be recorded in the session log.

At block 302, an incoming telephone call is received by the telephone system via a network, e.g., a PSTN. The incoming telephone call is initiated from an external telephone number outside the telephone system. The external telephone number that is assigned to the external telephone by the PSTN may be acquired by the telephone system when the incoming telephone call is received.

At decision block 303, the telephone system may search the session log for the external telephone number to determine whether any telephone calls with that external telephone number have been previously logged. In one embodiment, the telephone system may check the external telephone number in the called party field of call session records maintained by the session log. If there is a matched session, the telephone system may determine that the external telephone number was called by an internal extension. Information associated with the matched session may be extracted by the telephone system to determine which internal extension number was the caller and when the previous call was made by the caller. In another embodiment, the telephone system may check the external telephone number in the called party field of call session records maintained by the session log. If there is a matched session, the telephone system may determine that the external telephone number has called the telephone system before and the call from the external telephone number was routed to the internal extension that is recorded in the called party field of the matched session. In other embodiments, the telephone system may check for the external telephone number in both the called party field and the calling party field of call session records maintained by the session log and extract the corresponding internal extension number in the matched session.

At decision block 304, the telephone system may determine whether the incoming telephone call is to be automatically routed directly to the internal extension number extracted from the matched session at block 303. In one embodiment, automatic direct routing is performed only for inbound calls that are determined to be call-backs or return calls.

In one embodiment, the determination made at decision block 304 is based on a set of routing rules. For example, the administrator of the telephone system may setup a routing rule that causes an incoming telephone call from an external telephone number that is received within a predetermined or configurable period of time of a previously logged incoming or outgoing call corresponding to the same external telephone number to or from a particular internal extension number to be routed directly to the internal extension number. In the present example, suppose the telephone system has a PSTN number of 408-235-7700. Further assume that an internal extension number, e.g., 81154, previously called an external telephone number, e.g., 510-666-xxxx at 10:30 am and the external telephone number did not answer the call. The telephone system (e.g., call monitor 233 of FIG. 2) may record information regarding the calling party, the called party and the time of the call in a session log (e.g., session log 234 of FIG. 2). Then, at a later time when the external callee notices the missed telephone call on his phone and calls back the telephone system's PSTN number at 10:35 am, the telephone system may intelligently route the call to the internal extension number that just attempted to call the external telephone number five minutes prior. For example, when the telephone system receives the incoming telephone call from the external telephone number, the telephone system may retrieve the previous call record associated with external telephone number 510-666-xxxx from the session log and determine that the external telephone number 510-666-xxxx was called by internal extension number 81154 five minutes before. It is highly likely that the present incoming telephone call from the external telephone number 510-666-xxxx is a call-back to internal extension number 81154 responsive to its prior call to external telephone number 510-666-xxxx. When a routing rule established by the administrator so specifies (subject to policies and/or options that may be specified by the user as discussed further below), the telephone system, rather than prompting the callee for an internal extension number, may determine this inbound call is to be automatically routed directly to the internal extension number at block 304. At block 307, the incoming telephone call is routed to the internal extension number determined by the telephone system directly. In one embodiment, the telephone system may prompt the external caller to choose between entering an internal extension number or being directed to the internal extension number that originated the earlier call. Alternatively, the telephone system may automatically direct the call without any prompt to the caller.

In another embodiment, the administrator of the telephone system may setup a routing rule that allows a second call from the same caller within a predetermined or configurable period of time to be automatically routed directly to the internal extension number that answered the external telephone number before. In this example, suppose the external telephone number 510-666-xxxx made a first telephone call to the telephone system at 10:30 am and the internal extension 81154 answered the first incoming telephone call and the call was ended at 10:35 am. The telephone system may record information regarding the calling party, the called party, the start time and the end time of the call for the first incoming telephone call in the session log. Then, when the caller makes a telephone call to the PSTN number of the telephone system subsequently at 10:36 am, the telephone system may retrieve the session record of the first incoming telephone call and determine that the external telephone number 510-666-xxxx called one minute before. It is highly likely that the external caller associated with the present incoming telephone call would like to be connected to the same internal extension number 81154 that answered previously. At block 304, the telephone system may determine that the incoming telephone call should be routed directly to the internal extension number. At block 307, the incoming telephone call is routed to the internal extension number directly. In one embodiment, the telephone system may prompt the external caller to choose between entering an internal extension number or being directed to the prior internal extension number. Alternatively, the telephone system may automatically direct the call without any prompt to the caller.

Returning to decision block 304, in one embodiment, if the telephone system determines the probability of the incoming telephone call being a call-back or a return call does not meet a predetermined or configurable threshold established by the administrator (e.g., defined as part of a particular routing rule or defined at a user or global level), based on one or more of the amount of time that has elapsed since the most recently identified matching call record and the total number of prior matching call records, for example, a determination may be made that the incoming phone call should not be automatically routed directly to the internal extension number. The telephone system may, for example, play a prompt message back to the caller to indicate that the present call will be routed to the internal extension number in the matched session unless another option or extension is entered by the caller According to one embodiment, the telephone system may generate and play back an option message that includes further dial options to be selected by the caller. The dial options may include, but are not limited to, an intelligent and dynamic option based on a calling history associated with the external telephone number. Based on the calling history, the intelligent option may identify one or more internal extension numbers that have made telephone call to or received telephone calls from the external telephone number previously and allow the caller to select an internal extension number to which his/her call will be routed. For example, if the most recent internal extension number that dialed the external telephone number was 81154 and the most recent internal extension number that answered the external telephone number was 81164. The dial options in the option message played back to the caller may be:

"Dial 1 for extension 81154 to reach Adam" or "Dial 1 for extension 81154 to reach Adam, who attempted to call you at <time> on <date>"

"Dial 2 for extension 81164 to reach David" or "Dial 2 for extension 81164 to reach David, who you previously spoke with at <time> on <date>"

"Dial 0 for operator"

"Dial the extension number"

The caller may then dials a number (e.g., 1 or 2 in connection with the above example) on the dial pad of his phone corresponding to one of the options provided. Then, at block 306, the telephone system receives the option selected by the caller. Assuming the caller selected option 1 or 2, at block 307, the telephone system routes the incoming telephone call to the corresponding internal extension number corresponding to the option selected by the caller. When the internal extension number in the option message is indeed the number that the caller desired to be connected with, only one digit is dialed by the caller instead of the whole internal extension number which may be 3-5 digits long.

Referring back to block 303, if the external telephone number of the incoming telephone call cannot be found in the session log, it means that the external telephone number has not made a telephone call to or received a telephone call from the telephone system before (or such calls are not within a predefined or configurable look-back time period). When no call session records are found at decision block 303, then the call routing process may branch to block 305 where typical prior art call routing processing may be performed. For example, a message with regular options may be played to the caller and the caller may select an option based on the message or dial an internal extension number.

In some scenarios, directly routing an incoming telephone call from an external telephone number to an internal extension number that has made a telephone call to or received a telephone call form the internal extension number may not be the result desired by one or both of the calling party or called party. In other scenarios, when multiple internal extension numbers have been involved in telephone calls with the calling party previously, it is desirable for the telephone system to select suitable options to be included in the dial options that are to be played back to the caller.

Therefore, a routing rule set may be defined by the administrator of the telephone system so that the incoming telephone call may be routed to a suitable internal extension number securely and intelligently.

In one embodiment, a routing rule set may define different operations for incoming telephone calls from a particular external telephone number depending upon whether the internal extension number at issue has previously called the external telephone number before, for example. In the rule set, the telephone system may determine if the incoming telephone call is a call-back and the corresponding operation to be performed on the incoming telephone call based on one or more factors including, but not limited to, the incoming telephone call, times of sessions in the session log, duration of sessions in the session log and status of the internal extension number. These operations may include automatically directly routing the incoming call, playing a prompt message including a suggested internal extension and/or a regular operation. Various non-limiting examples of rules that may be associated with call-backs are listed in Table 2.

TABLE 2

| Session Log Information | Incoming Call | Rule | Decision | action |
|---|---|---|---|---|
| External phone number 415-999-4123 was called by internal extension number 81417 at 10:30 am | External phone number 415-999-4123 calls at 10:35 am | Incoming call is received within X minutes after the previous call | The call is a call back | Route directly to internal extension number 81417 |
| External phone number 415-999-4123 was called by internal extension number 81417 at 10:30 am | External phone number 415-999-4123 calls at 12:35 am | Incoming call is received between X-Y minutes after the previous call | The call may be a call back | Send a prompt message including extension number 81417 |
| External phone number 415-999-4123 was called by internal extension number 81417 at 10:30 am | External phone number 415-999-4123 calls at 12:35 am two days later | Incoming call is received after Y minutes after the previous call | Not a call back | Perform regular (prior art) call routing processing |

In another embodiment, a routing rule set may define different operations to perform on incoming calls that are return calls. A "return call" generally refers to an incoming telephone call from an external telephone number which has called before and the previous call(s) from the external telephone number were answered by one or more internal extension numbers. Various non-limiting examples of rules that may be associated with return calls are listed in Table 3.

TABLE 3

| Session Log | Incoming Call | Rule | Decision | action |
|---|---|---|---|---|
| A phone call from external phone number 415-999-4123 was transferred to internal extension number 81417 at 9:30 am | External phone number 415-999-4123 calls at 10:35 am | Time of incoming phone call is during business hours | The call is a call back | Route directly to internal extension number 81417 |
| A phone call from external phone number 415-999-4123 was | External phone number 415-999-4123 calls | The previous internal extension | The call is a call back | Route directly to internal extension number 81417 |

TABLE 3-continued

| Session Log | Incoming Call | Rule | Decision | action |
|---|---|---|---|---|
| transferred to internal extension number 81417 at 9:30 am | at 10:35 am | number belongs to Sales/Services department | | |
| A phone call from external phone number 415-999-4123 was transferred to internal extension number 81417 at 9:30 am | External phone number 415-999-4123 calls at 10:35 am | The external phone number has been answered by the internal extension number once | The call may be a call back | Send a prompt message including extension number 81417 |
| Phone calls from external phone number 415-999-4123 were transferred to internal extension number 81417 at 9:30 am and 10:00 am | External phone number 415-999-4123 calls at 10:35 am | The external phone number has been answered by the internal extension number more than once | The call is a call back | Route directly to internal extension number 81417 |
| A phone call from external phone number 415-999-4123 was transferred to internal extension number 81417 at 9:30 am | External phone number 415-999-4123 calls at 10:35 am | The external phone number is a personal phone number | The call is a call back | Route directly to internal extension number 81417 |
| A phone call from external phone number 415-999-4123 was transferred to internal extension number 81417 at 9:30 am and a voice message was left | External phone number 415-999-4123 calls at 10:35 am | The external phone number left a voice message with internal extension number | The call is a call back | Route directly to internal extension number 81417 |

In a further embodiment, if an external telephone number of the incoming telephone call matches one or more sessions with an internal extension, a probability score may be assigned to the internal extension number for each of the sessions based on a routing rule. For example, the probability score may be associated with the time difference between the time of receiving the incoming telephone call and the end time of the most recent call with the external telephone number. The probability score may be also be associated with the times of calls made between the external telephone number and the internal extension number. These scores may be combined and compared with predetermined thresholds. For example, when the accumulated score is lower than a first threshold, the telephone system may determine that the probability that the incoming telephone call is a call-back to the internal extension is low and the incoming telephone call is processed in the regular fashion. If, however, the accumulated score is higher than the first threshold, the telephone system determines that the probability that the incoming telephone call is a call-back to the internal extension is high. In this case, a dynamic option message including the suggested internal extension number may be played back to the external telephone number. The caller may reach the internal extension number indicated in the message by, for example, dialing a digit on his phone pad instead of dialing the whole internal extension number which may be 3-5 digits long. If the combined score is higher than a second threshold which is higher than the first threshold, the telephone system may determine that the probability that the incoming telephone call is a call-back to the internal extension is very high. In this case, the telephone system may automatically route the incoming telephone call directly to the internal extension number determined by the phone system without playing back a prompt message.

In some embodiments, the user of the internal extension may be provided with the ability to configure the policy for the direct internal routing features. For example, the user of the internal extension may enable/disable this function through a menu displayed on the panel of his telephone. The user may further designate the time period(s), e.g., 9:00 am-6:00 pm, during which this direct internal routing feature may be enabled for his/her extension. The user may also set a time limit, e.g., 2 hours, within which an inbound call may be considered a call-back. The user may further select whether his/her name will be included in a dynamic option message played back to the caller.

Figure 4:
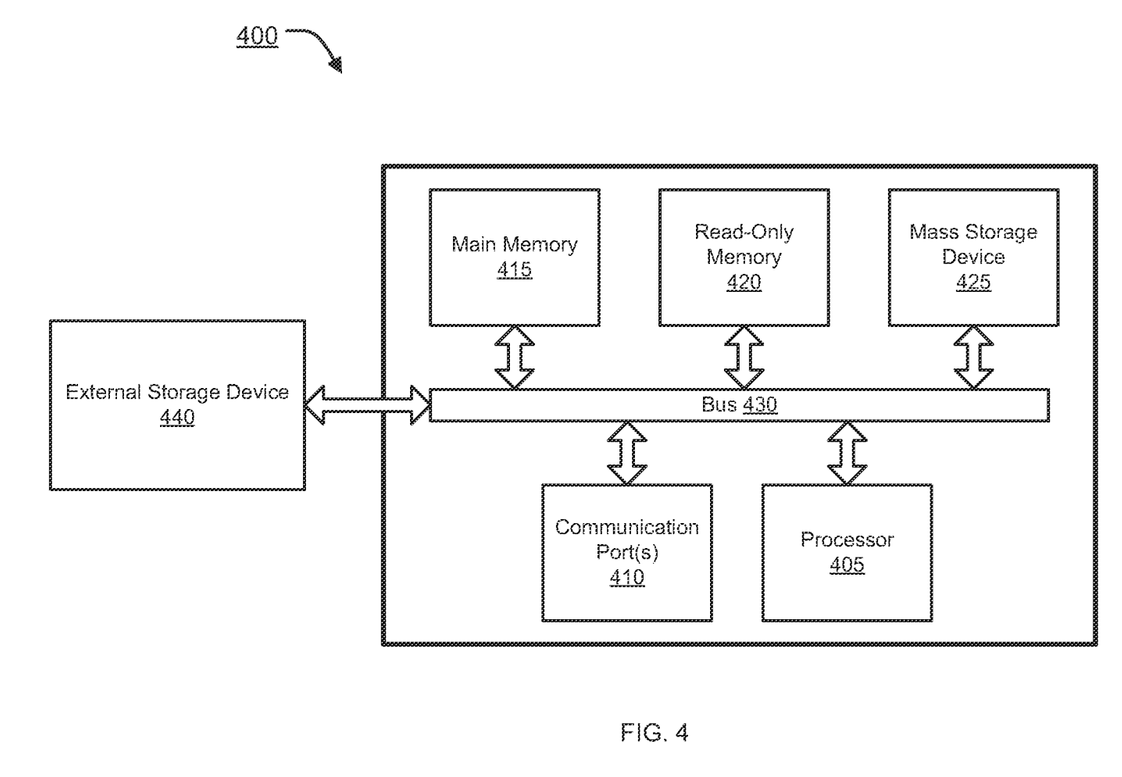
FIG. 4 is an exemplary computer system in which or with which embodiments the present invention may be utilized.

FIG. 4 is an example of a computer system 400 with which embodiments of call monitor of the present invention may be utilized. Computer system 400 may represent or may be a part of a phone system (e.g., phone system 230), a call monitor (e.g., call monitor 233), a switch (e.g., switch 231), a network appliance, a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 400 includes a bus 430, a processor 405, communication port 410, a main memory 415, a removable storage media 440, a read only memory 420 and a mass storage 425. A person skilled in the art will appreciate that computer system 400 may include more than one processor and communication ports.

Examples of processor 405 include, but are not limited to, an Intel® Itanium® or Itanium 2 processor(s), or AMDC®

Opteron® or Athlon MP® processor(s), Motorola® lines of processors, FortiSOC™ system on a chip processors or other future processors. Processor 405 may include various modules associated with embodiments of the present invention.

Communication port 410 can be any of an RS-232 port for use with a modem based dialup connection, a 10/100 Ethernet port, a Gigabit or 10 Gigabit port using copper or fiber, a serial port, a parallel port, or other existing or future ports. Communication port 410 may be chosen depending on a network, such a Local Area Network (LAN), Wide Area Network (WAN), or any network to which computer system 400 connects.

Memory 415 can be Random Access Memory (RAM), or any other dynamic storage device commonly known in the art. Read only memory 420 can be any static storage device(s) such as, but not limited to, a Programmable Read Only Memory (PROM) chips for storing static information such as start-up or BIOS instructions for processor 405.

Mass storage 425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 430 communicatively couples processor(s) 405 with the other memory, storage and communication blocks. Bus 430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 405 to system memory.

Optionally, operator and administrative interfaces, such as a display, keyboard, and a cursor control device, may also be coupled to bus 430 to support direct operator interaction with computer system 400. Other operator and administrative interfaces can be provided through network connections connected through communication port 410.

Removable storage media 440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   maintaining, by a call monitor of a telephone system, a session log containing information regarding sessions between internal extension numbers and external telephone numbers, wherein each of the internal extension numbers is associated with a telephone extension within the telephone system and each of external telephone numbers is associated with a telephone outside the telephone system;
   receiving, by the call monitor, an incoming telephone call from a telephone outside the telephone system that is associated with an external telephone number;
   determining, by the call monitor, whether the incoming call represents a call-back to an internal extension number based on the session log by calculating a probability score that the incoming telephone call is a call-back to an internal extension number within one or more call session records of the session log containing the external telephone number and comparing the probability score to a predetermined threshold;
   playing a prompt message back to the external telephone number indicating that the incoming phone call is to be routed to the internal extension number determined by the call monitor; and
   when a result of said determining is affirmative, then causing, by the call monitor, the incoming telephone call to be routed by a switch to the internal extension number.

2. The method of claim 1, wherein the information regarding sessions includes information regarding a calling party and information regarding a called party.

3. The method of claim 2, wherein said determining includes evaluating whether the external phone number is contained within the information regarding the called party of a session in the session log and whether the internal extension number is contained within the information regarding the calling party of the session.

4. The method of claim 2, wherein said determining includes evaluating whether the external phone number is contained within the information regarding the calling party of a session in the session log and whether the internal extension number is contained within the information regarding the called party of the session.

5. The method of claim 1, wherein said routing comprises routing the incoming telephone call to the internal extension number by the switch directly without playing a prompt message to the external telephone number.

6. The method of claim 1, wherein the prompt message is played back to the external telephone number before the incoming telephone call is routed to the internal extension number.

7. The method of claim 1, further comprising:
   playing, by the call monitor, an option message back to a caller of the incoming call, wherein the option message includes one or more internal extension numbers identified by the call monitor based on the session log;
   receiving, by the call monitor, a selection from the caller of one of the one or more identified internal extension numbers; and
   causing, by the call monitor, the incoming telephone call to be routed by the switch to the selected internal extension number.

8. The method of claim 1, wherein the call monitor includes a rule set according to which the incoming telephone call is routed to an internal extension number of a matched session within the session log.

9. The method of claim 8, wherein the rule set includes conditions based upon one or more of (i) a start time of the incoming telephone call, (ii) a start time of the matched session, (iii) an end time of the matched session, (iv) a duration of the matched session and (v) a status of the internal extension number.

10. The method of claim 1,
wherein the result of said determining is affirmative when the probability score exceeds the predetermined threshold.

11. A computer system comprising:
non-transitory storage device having tangibly embodied therein instructions representing a call monitor application of a telephone system; and
one or more processors coupled to the non-transitory storage device and operable to execute the call monitor application to perform a method comprising:
maintaining a session log containing information regarding sessions between internal extension numbers and external telephone numbers, wherein each of the internal extension numbers is associated with a telephone extension within the telephone system and each of external telephone numbers is associated with a telephone outside the telephone system;
receiving an incoming telephone call from a telephone outside the telephone system that is associated with an external telephone number;
determining whether the incoming call represents a call-back to an internal extension number based on the session log by calculating a probability score that the incoming telephone call is a call-back to an internal extension number within one or more call session records of the session log containing the external telephone number and comparing the probability score to a predetermined threshold;
playing, by the call monitor, an option message back to a caller of the incoming call, wherein the option message includes one or more internal extension numbers identified by the call monitor based on the session log;
receiving, by the call monitor, a selection from the caller of one of the one or more identified internal extension numbers; and
when a result of said determining is affirmative, then causing the incoming telephone call to be routed by a switch to the selected internal extension number.

12. The computer system of claim 11, wherein the information regarding sessions includes information regarding a calling party and information regarding a called party.

13. The computer system of claim 12, wherein said determining includes evaluating whether the external phone number is contained within the information regarding the called party of a session in the session log and whether the internal extension number is contained within the information regarding the calling party of the session.

14. The computer system of claim 12, wherein said determining includes evaluating whether the external phone number is contained within the information regarding the calling party of a session in the session log and whether the internal extension number is contained within the information regarding the called party of the session.

15. The computer system of claim 11, wherein said routing comprises routing the incoming telephone call to the internal extension number by the switch directly without playing a prompt message to the external telephone number.

16. The computer system of claim 11, wherein the method further comprises playing a prompt message back to the external telephone number before the incoming telephone call is routed to the internal extension number; wherein the prompt message indicates that the incoming phone call is to be routed to the internal extension number determined by the call monitor.

17. The computer system of claim 11, wherein the call monitor application includes a rule set according to which the incoming telephone call is routed to an internal extension number of a matched session within the session log.

18. The computer system of claim 17, wherein the rule set includes conditions based upon one or more of (i) a start time of the incoming telephone call, (ii) a start time of the matched session, (iii) an end time of the matched session, (iv) a duration of the matched session and (v) a status of the internal extension number.

19. The computer system of claim 11,
wherein the result of said determining is affirmative when the probability score exceeds the predetermined threshold.

20. The computer system of claim 11, wherein the option message identifies one or more internal extension numbers that have made a telephone call to or received telephone calls from the external telephone number previously.

* * * * *